United States Patent
Ackley et al.

(10) Patent No.: US 7,496,277 B2
(45) Date of Patent: Feb. 24, 2009

(54) SYSTEM AND METHOD OF PROGRAMMATIC WINDOW CONTROL FOR CONSUMER VIDEO PLAYERS

(75) Inventors: Jonathan Ackley, Glendale, CA (US); Christopher T. Carey, Santa Clarita, CA (US); Bennet S. Carr, Burbank, CA (US); Kathleen S. Poole, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 977 days.

(21) Appl. No.: 10/859,885

(22) Filed: Jun. 2, 2004

(65) Prior Publication Data

US 2005/0019015 A1 Jan. 27, 2005

Related U.S. Application Data

(60) Provisional application No. 60/475,340, filed on Jun. 2, 2003.

(51) Int. Cl.
*H04N 5/76* (2006.01)
*H04N 7/00* (2006.01)
*H04N 7/087* (2006.01)

(52) U.S. Cl. .......................... 386/84; 386/46
(58) Field of Classification Search ................. 386/46, 386/52, 131; 348/564–568, 588
See application file for complete search history.

(56) References Cited

U.S. PATENT DOCUMENTS

| 4,333,152 A | 6/1982 | Best |
| 4,792,895 A | 12/1988 | Tallman |
| 4,831,541 A | 5/1989 | Eshel |
| 5,522,075 A | 5/1996 | Robinson et al. |
| 5,548,340 A | 8/1996 | Bertram |
| 5,606,374 A | 2/1997 | Bertram |

(Continued)

FOREIGN PATENT DOCUMENTS

EP 0982947 3/2000

(Continued)

OTHER PUBLICATIONS

Adve, et al., *LLVA: A Low-level Virtual Instruction Set Architecture*, In Proc. 36th Symposium on Microarchitecture, (2003 IEEE).

(Continued)

*Primary Examiner*—Thai Tran
*Assistant Examiner*—Nigar Chowdhury
(74) *Attorney, Agent, or Firm*—Farjami & Farjami LLP

(57) ABSTRACT

A media playback device capable of displaying multiple streams simultaneously and with expanded picture-in-picture capabilities is provided. The placement, size, aspect ratio, cropping, scale, transparency, tint, contrast, and cropping of the media can be set or adjusted arbitrarily. Furthermore, the audio may be mixed between separate tracks accompanying the video streams and may also be set or adjusted arbitrarily. Each variable can be dynamically changed during playback through either automated or user-initiated means. A system and method are provided for simultaneously displaying a first video stream and at least a second video stream on a display comprising the steps of feeding the video streams into a video player; providing control of the display of the video streams; displaying a first video stream substantially across the display; and displaying the other video streams in a secondary display.

28 Claims, 9 Drawing Sheets

U.S. PATENT DOCUMENTS

| | | | |
|---|---|---|---|
| 5,634,850 A | 6/1997 | Kitahara et al. | |
| 5,699,123 A | 12/1997 | Ebihara et al. | |
| 5,708,845 A | 1/1998 | Wistendahl et al. | |
| 5,818,439 A | 10/1998 | Nagasaka et al. | |
| 5,847,771 A * | 12/1998 | Cloutier et al. | 348/564 |
| 5,892,521 A | 4/1999 | Blossom et al. | |
| 5,893,084 A | 4/1999 | Morgan et al. | |
| 5,929,849 A | 7/1999 | Kikinis | |
| 5,956,092 A | 9/1999 | Ebihara et al. | |
| 5,987,509 A | 11/1999 | Portuesi | |
| 6,069,669 A | 5/2000 | Park et al. | |
| 6,262,746 B1 | 7/2001 | Collins | |
| 6,362,816 B1 | 3/2002 | Kawanami et al. | |
| 6,373,500 B1 | 4/2002 | Daniels | |
| 6,407,779 B1 | 6/2002 | Herz | |
| 6,493,038 B1 | 12/2002 | Singh et al. | |
| 6,539,240 B1 | 3/2003 | Watanabe | |
| 6,570,587 B1 | 5/2003 | Efrat et al. | |
| 6,868,449 B1 | 3/2005 | Miyamoto et al. | |
| 7,027,101 B1 | 4/2006 | Sloo et al. | |
| 7,043,726 B2 | 5/2006 | Scheetz et al. | |
| 7,051,005 B1 | 5/2006 | Peinado et al. | |
| 7,069,311 B2 | 6/2006 | Gupta et al. | |
| 7,162,531 B2 | 1/2007 | Paz et al. | |
| 7,210,144 B2 | 4/2007 | Traut | |
| 7,346,698 B2 | 3/2008 | Hannaway | |
| 2001/0021926 A1 | 9/2001 | Schneck et al. | |
| 2002/0054049 A1 | 5/2002 | Toyoda et al. | |
| 2002/0059456 A1 | 5/2002 | Ha et al. | |
| 2002/0060750 A1 | 5/2002 | Istvan et al. | |
| 2002/0083449 A1 | 6/2002 | Im | |
| 2002/0097280 A1 | 7/2002 | Loper et al. | |
| 2002/0138851 A1 | 9/2002 | Lord et al. | |
| 2002/0141582 A1 | 10/2002 | Kochen et al. | |
| 2002/0161996 A1 | 10/2002 | Koved et al. | |
| 2002/0162117 A1 | 10/2002 | Pearson et al. | |
| 2002/0169987 A1 | 11/2002 | Meushaw et al. | |
| 2002/0184520 A1 | 12/2002 | Bush et al. | |
| 2002/0194612 A1 | 12/2002 | Lundberg et al. | |
| 2003/0046557 A1 | 3/2003 | Miller et al. | |
| 2003/0170011 A1 | 9/2003 | Otsuka et al. | |
| 2003/0190950 A1 | 10/2003 | Matsumoto | |
| 2003/0196100 A1 | 10/2003 | Brawrock et al. | |
| 2004/0047588 A1 | 3/2004 | Okada et al. | |
| 2004/0067048 A1 | 4/2004 | Seo et al. | |
| 2004/0133794 A1 | 7/2004 | Kocha et al. | |
| 2004/0175218 A1 | 9/2004 | Katzer | |
| 2004/0268135 A1 | 12/2004 | Zimmer et al. | |
| 2005/0019015 A1 | 1/2005 | Ackley et al. | |
| 2005/0020359 A1 | 1/2005 | Ackley et al. | |
| 2005/0022226 A1 | 1/2005 | Ackley et al. | |
| 2005/0223220 A1 | 10/2005 | Campbell et al. | |
| 2006/0069925 A1 | 3/2006 | Nakai et al. | |
| 2007/0033419 A1 | 2/2007 | Kochen et al. | |

FOREIGN PATENT DOCUMENTS

| | | |
|---|---|---|
| EP | 1304876 | 4/2003 |
| WO | WO 00/17643 | 3/2000 |
| WO | WO 01/65832 | 9/2001 |
| WO | WO 01/73525 | 10/2001 |

OTHER PUBLICATIONS

Kocher, et al., *Self-Protecting Digital Content*, Cryptography Research, Inc., pp. 1-14 (2002-2003).

*Trusted Computing Platform Alliance (TCPA) Main Specification Version 1.1b*, Trusted Computing Group, (Feb. 2002).

Schödl, et al., *Controlled Animation of Video Sprites*, Georgia Institute of Technology college of Computing, pp. 121-127, 196 (2002).

* cited by examiner

SYSTEM AND METHOD OF PROGRAMMATIC WINDOW CONTROL FOR CONSUMER VIDEO PLAYERS

RELATED APPLICATIONS

This application claims priority to U.S. Provisional Patent Application No. 60/475,340, filed Jun. 2, 2003, which is incorporated herein by reference in its entirety. This application is also related to U.S. Utility Patent Application No. 10/860,572 entitled "System and Method of Interactive Video Playback"; U.S. Utility Patent Application No. 10/859,888 entitled "System and Method of Dynamic Interface Placement Based on Aspect Ratio"; U.S. Utility Patent Application No. 10/859,732 entitled "System and Method of Video Player Commerce"; and U.S. Utility Patent Application No. 10/859,887 entitled "Video Playback Image Processing"; all of which are filed concurrently herewith on Jun. 2, 2004, and incorporated by reference herein in their entirety.

BACKGROUND

1. Field

In general, the field of the invention relates to digital video control. Specifically, the field of the invention relates to picture in picture functionality in digital formats.

2. General Background and State of the Art

Interactive multimedia provides for a user to more fully appreciate a subject by exploring the varied multimedia resources available. Interactive multimedia includes the integration of text, audio, graphics, still image and moving pictures into a single, computer-controlled, multimedia product. The desire for interactive multimedia grows along with the desire for increasing data storage for these programs.

In one conventional application, interactive media is used as a learning tool for a user. The multimedia platform provides many advantages, including the ability to customize to the user's abilities and preferences. As a result, the user can control the path of the lesson. The multimedia lesson may direct the user through information or, alternatively, allow the user to explore the many facets on his own. By customizing the interface and levels of guidance for each user, the interactive multimedia program provides more effective learning. Interactive multimedia is not just limited to educational means; it may also be utilized for entertainment, presentations, and the like.

DVDs and other digital media players, such as high definition video players and software DVD-ROM, provide an increased amount of data storage and, thus, more avenues for media integration. Increased storage capacity translates into the ability to hold more information on a single disc or drive. In addition to increased storage capacity, this digital media can provide higher quality video and audio. Programming options include labeling segments of a film, wherein the user can select the segment for direct viewing. Often, these segments appear in an on-screen index available to the user from the top DVD menu or main menu screen. As a result, the user cannot select a desired scene without stopping the playing of the film and returning to the main menu screen.

DVDs are limited in that they cannot display at least two simultaneous streams of data throughout a transmission. Conventional systems allow for a user to select different angles during playing of the DVD. When an alternative angle is selected, display changes from a first angle to the selected angle. In order to view alternative angles, a menu or index is not available during the playing of the DVD. Once again, the user must return to the main menu to preview the various angles. During play, the user can toggle through the various angles by continuously pressing the "angle" button on a remote control. The user must continue to toggle through the angles until satisfied with a view currently displayed on the screen. As a result of not being subject to the different angles at all times, the user is unaware of other angles that may provide a better view through a different angle.

Attempts to display numerous streams of video and/or audio have had limited success. Many types of media have been employed to attempt to provide more viewing options for the user. CD-ROMs are one such conventional attempt. CD-ROMs are similar to DVDs, but have a much smaller capacity. With such a small capacity, streaming video utilizes a significant amount of storage. As a result, the ability to display a few streams of video simultaneously is limited by the amount of storage.

Conventional televisions provide the ability to view two channels simultaneously. This television feature is known as picture-in-picture. Picture-in-picture displays a primary television broadcast as usual on the television screen. A second television broadcast is overlaid on the primary television broadcast in a rectangular-shaped box substantially near the corner of the television display. The rectangular-shaped box is positioned such that it may be blocking a desirable portion of the first broadcast. The user does not have the option to reposition the box to another location on the screen. Additionally, the user cannot resize the box to become larger or smaller. Similarly, the aspect ratio of the box is predetermined and fixed. Essentially, the box is "static."

The operating systems of personal computers utilize "windows" to display content. While the operating system windows provide some solutions to the static television picture-in-picture, conventional operating systems do not allow for simultaneous viewing of streaming data in sufficiently customizable "windows." Each window is often the result of running a new program. The operating system is limited in its ability to provide multiple audio or video data streaming simultaneously in a plurality of customizable windows on the screen. Further, the use of windows on an operating system for a personal computer does not translate to a television viewing apparatus. A television cannot be readily adapted to provide windows similar to an operating system.

In viewing digital format, a user desires the ability to view simultaneous streaming audio and/or video, along with the ability to customize and manipulate the various media. More specifically, the user desires an ability to reposition streaming media on a screen, change the size of the streaming media on the screen, mix the audio of the streaming media with a primary transmission, use a "zoom" feature within the streaming media, crop the streaming media, alter the aspect ratio of the streaming media, choose a layering format for the various media, and modify the visual properties of the media such as transparency, tint, and contrast.

These conventional systems neither achieve nor teach the simultaneous viewing of interleaved audio and/or video streams with these desired features. Providing such a capability in a next generation of video playback devices will give consumers great freedom to customize their own viewing experiences. Additionally, improvements to the playback platform can also increase the ability of artists and content companies to provide innovative viewing experiences.

SUMMARY

A system and method of programmatic window control provides video playback devices with the ability to display multiple media streams simultaneously on the same screen.

Video playback devices include, but are not limited to, DVD players, High-Definition video players, PC DVD-ROMs, and the like. The properties of the media streams can by dynamically and independently controlled either by user input or by programmatic means.

The present disclosure expands on the concept of picture-in-picture for video playback devices by providing such a format along with customizable features. The placement, size, aspect ratio, cropping, scale, transparency, tint, contrast, and cropping of the media can be set or adjusted arbitrarily. Furthermore, the audio may be mixed between separate tracks accompanying the video streams and may also be set or adjusted arbitrarily. Each variable can be dynamically changed during playback through either automated or user-initiated means.

In one embodiment, a first video stream and a second video stream are simultaneously displayed on a display. The first and second media streams are received by a media playback device comprising a processor. The first and second video streams are synchronized such that at least a portion of each of the video streams are displayed synchronously. The first video stream is displayed on the display, wherein the first video stream substantially extends across the display. The second video stream is optionally displayed in a customizable secondary display, wherein the second video stream has a playback synchronized to the playback of the first video stream. A third video stream may be provided to the media playback device and displayed in the customizable secondary display.

The at least one of the plurality of video streams may come from removable media such as a DVD or CD, or an Internet source, a personal computer, a hard drive, a LAN storage, or a server. The media playback device may be a DVD player, a personal computer, a home media server, a high definition video player, an optical player, a hard drive based player, or a software DVD-ROM player.

In one embodiment, the customizable secondary display is displayed by choosing a menu option, perhaps through the use of an input device such as a remote control. Descriptive text, such as the name of the menu item may be displayed on the customizable secondary display.

In one embodiment, the customizable secondary display can be resized or the aspect ratio can be altered. The aspect ratio of the at least a second video stream can also be altered. The first video stream can be swapped with one of the at least a second video stream, wherein the first video stream is displayed in the customizable secondary display and one of the at least a second video stream is displayed substantially across the display. The customizable secondary display can be repositioned to another location on the display. The at least a second video stream in the customizable secondary display can be replaced with the third video stream. The third video stream can be displayed in addition to at least a second video stream in the customizable secondary display.

The user can vary the audio properties of the first video stream and at least a second video stream. The secondary display can be resized to extend substantially across the display wherein the at least a second video stream overlays the first video stream. The user can change the customizable secondary display properties through a remote control, mouse, or keyboard, or gaming controller.

Another embodiment provides a system for displaying a first and a second video stream on a display, the system comprising a media playback device for receiving and playing the first and second video streams, wherein the first and second video streams are provided from a media source to the media playback device, and wherein the media playback device plays the first video stream on the display; the media playback device having a CPU and a media co-processor, wherein the CPU receives commands of a user and commands the media co-processor to display or modify the first and second video stream and the secondary display. The system further comprises a remote control, mouse, keyboard, or gaming controller to command the CPU. The system further comprises a cursor on the display to assist the user with modifying the properties of the secondary display. The system further comprises an executable file, wherein the CPU runs the executable file to modify the properties of the video streams and the secondary display. The executable file further comprises control data, the control data having customizable properties for the secondary display. The executable is embedded in at least one video stream. The executable file may be provided in a stream other than the first or second video streams.

Still another embodiment provides a method for a media playback device to display at least two video streams on a display, the method comprising the steps of receiving at least two video streams in a media interface of the media playback device; receiving an running an executable file in a CPU of the media playback device; checking by the CPU of the at least two video streams for metatags; receiving a command at the CPU from a user to modify at least one of the at least two video streams on the display; commanding a media co-processor to provide the modified at least one of the at least two video streams to an output buffer for display; maintaining alignment of at least two video streams based on the metatags; and optionally displaying an aligned at least a second of the at least two video streams on the display. A relative offset between the at least two video streams is maintained.

The foregoing and other objects, features, and advantages will become apparent form a reading of the following detailed description of exemplary embodiments thereof, which illustrate the features and advantages of the invention in conjunction with references to the accompanying figures.

DRAWINGS

The accompanying drawings, which are included to provide a further understanding and are incorporated in and constitute a part of this specification, illustrate embodiments of the invention and together with the description serve to explain the principles.

DETAILED DESCRIPTION

The system and method add picture-in-picture functionality to media players. Specifically, the system and method apply to video players, including but not limited to DVD players, high definition video players, software DVD-ROM players, high definition video players, hard drive based players, optical players, personal computers, or any other media player known to one of ordinary skill in the art.

Figure 1A:
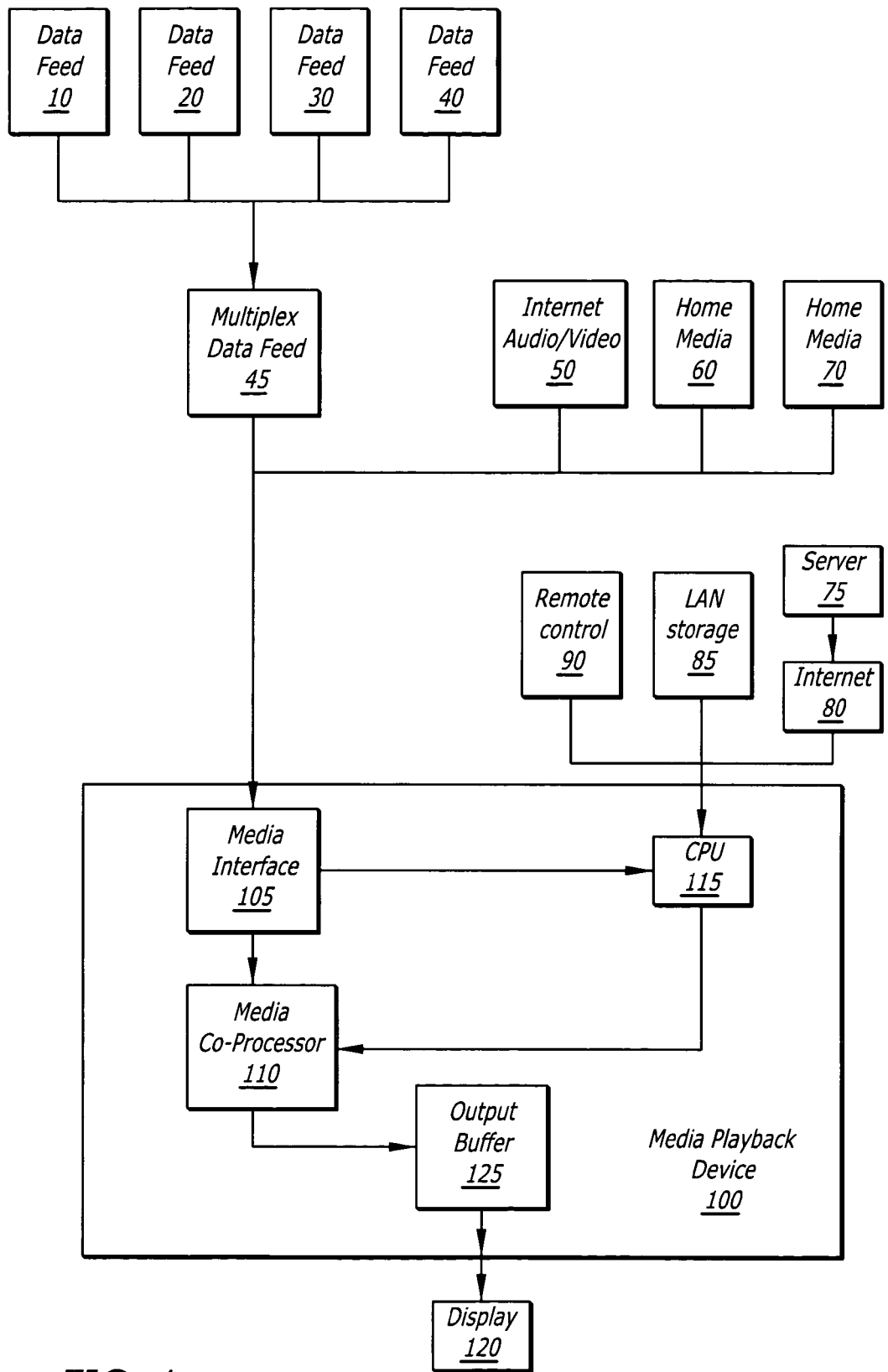
FIGS. 1a-1b are flow diagrams of the system according to an embodiment.

Referring to FIG. 1a, a media playback device 100 receives at least two streams of media data. Optionally, the at least two streams of media data are streamed to the video player 100 such that the media data of a first data stream corresponds in timing to at least a second data stream. The data streams may be logically multiplexed data feeds or from multiple sources, or a combination of the two.

Data streams may be logically multiplexed data feeds, as illustrated by multiplex data feed 45. Multiplex data feed 45 is a combination of data feeds 10, 20, 30, 40 encoded in the same data feed 45. Data feeds 10, 20, 30, 40 may be transmitted from a CD, CD-ROM, DVD, DVD-ROM, television cable provider, or other data storage or transmittal device known in the art for providing multiple data streams. In an exemplary embodiment, a high definition video player contains a movie along with an additional four multiplexed video and audio tracks. These additional four multiplexed video and audio tracks contain scenes and additional material. The four multiplexed video and audio tracks are timed to match related content in the movie playing from the main video stream. Multiplexed data feed 45 may communicate with video player 100 through wireless means or a wired network.

Simultaneously, an audio and/or video feed from the Internet 50 may be transmitting to video player 100 from an Internet source. The Internet source includes a personal computer, personal media player, or other device known in the art for transmitting data from the Internet. The Internet source may communicate with video player 100 through wireless means or a wired network.

Additionally, a home media server may transmit video streams 60, 70 to video player 100. The home media server may contain a mixture of audio and video formats of movies, songs, or other multimedia to be transmitted in streams 60, 70. The home media server may communicate with video player 100 through wireless means or a wired network.

A media playback device has a host CPU or processor 115, a media interface 105, a media co-processor 110, and an output buffer 125. Media interface 105 receives the various streams of media. The media may be multiplexed or separate streams. The media stream may also include an executable file. The executable file contains logic for placement of video streams on the display, resizing, demultiplexing video streams, and other functions known to one of ordinary skill in the art. The executable file is provided to CPU 115 via a control stream.

The executable file utilizes control data, which may be embedded on the video player, on the media, or from an alternative source, such as the Internet or a home media server. The executable file is optionally resident on the media. The executable file may also be loaded from an external storage media, embedded in firmware, burned into the logic on a dedicated computer chip, or received from a separate media stream. For example, the executable file may be provided via the internet 80 or a server 75, LAN storage 85, hard or floppy disk, CD or DVD, memory card, or other conventional means of storing and providing data. When the executable file is not resident on the media, the executable file goes directly to CPU 115, rather than through media interface 105.

CPU 115 executes the code in the executable file. CPU 115 analyzes timing, synchronization, and display properties of the streams, as well as application logic and user input. Display properties include scale, alpha transparency, position, rotation, etc. CPU 115 checks for time code, embedded metadata, and markers. The CPU also accesses video memory, enabling the system to arbitrarily insert graphics and text. In one embodiment, the CPU commands the system to send force feedback information to a gaming controller. The gaming controller might shake or vibrate corresponding to action on the screen.

The user may instruct CPU 115 through a remote control 90. Remote control 90 sends messages via infrared, internet protocols, or other control stream. Remote control 90 may be a conventional remote control, mouse, keyboard, or a gaming controller. CPU 115 receive commands from the user and makes logical decisions concerning the video streams.

The video streams are provided from media interface 105 to media co-processor 110. Media co-processor 110 receives commands from CPU 115 through media application program interfaces. Media co-processor 110 composites the video streams according to the instructions by CPU 115 and sends them to output buffer 125 for video output on display 120. Media co-processor 110 comprises hardware and software, although may function only as software. In another embodiment, media playback device 100 comprises several decompressors for the various video streams.

In one example, DVD media provides four video streams and an executable file to the media interface. The media interface sends the CPU the executable file and sends the video streams to the media co-processor. When the user uses the remote control to choose a secondary video stream to be displayed, the CPU sends a command to the media co-processor to display both video streams one and two in the format provided. The CPU also ensures synchronization of the streams. The composited image is sent to the output buffer, which has sufficient memory to provide a synchronized video output without any breaks due to user commands.

Figure 1B:
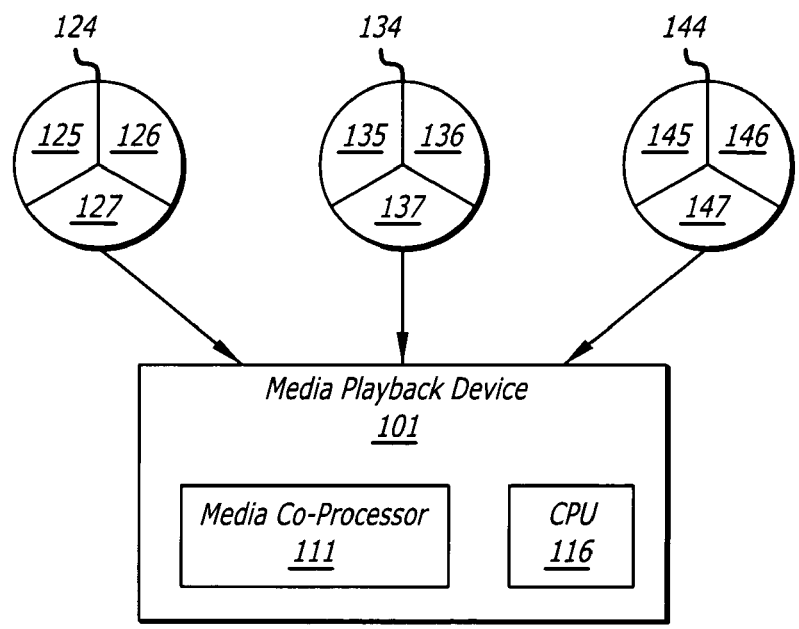

The media playback device ensures synchronized playback of video streams. Referring to FIG. 1b, a media playback device 101 receives a plurality of video streams 124, 134, 144. Each video stream comprises three components: a video asset, an audio asset, and a time asset. Video stream 124 comprises video asset 125, audio asset 126, and time asset 127; video stream 134 comprises video asset 135, audio asset 136, and time asset 137; video stream 144 comprises video asset 145, audio asset 146, and time asset 147. CPU 116 of media playback device 101 processes the metadata of video streams 124, 134, 144. The metadata may be within each video stream or provided in a separate stream to media playback device 101. As video streams 124, 134, 144 maintain relative offset based on their metadata, the CPU aligns the metadata such that a media co-processor 111 can provide video streams 124, 134, 144 in a synchronized fashion. Video streams 124, 134, 144 may contain content of varying lengths. CPU 116 aligns video and audio assets 125, 126, 135, 136, 145, 146 of varying length and media co-processor 111 sends arranged video and audio content to the display for viewing.

In one exemplary embodiment, video and audio streams 125, 126 are received at a time within its playback of 1:12:68. Video and audio streams 135, 136 are received at a time within its playback of 1:15:22. Video and audio streams 145, 146 are received at a time within its playback of 1:20:05. The logic in the executable maintains synchronization of the streams along playback. As one stream advances during playback, all other streams advance at a rate to maintain synchronization. Such a feature becomes desirable when streams are received from separate sources and are difficult to properly synchronize from the start. Media co-processor 111 receives the streams and maintains the relative offset for the various streams without any frame drift.

The media playback device presents a menu to the user during the operation of media. This menu may be presented before or during playback of the media. Upon a depression of a button on a remote control, joystick, or keyboard, a click on a mouse, or other activation through a remote device, an on-screen menu 50 is displayed.

The media co-processor provides the video streams for display. The CPU commands the control program to display certain streams as well as a graphic display to accompany the video streams. The display of the multiple data streams may be in a secondary display on the screen. The secondary display may be a rectangular-shaped arrangement of the multiple video streams.

The media playback device coordinates a layout of the secondary display. The media playback device may assert control either through direct control of the media playback device's video display buffer or, alternatively, through coordination of dedicated graphics hardware. In response to a user's command or according to programming, the CPU commands the media co-processor to show, hide, resize, reshape, move, or reposition any of the streaming data under its coordination. Due to the processing of the video streams, display properties can be changed on the display through arbitrary means and at the video frame-rate, thus not displaying any visible video display artifacts or frame drift.

The CPU can modify the video streams based on input. In an exemplary embodiment, the video streams may be rearranged within the display. Referring to FIG. 1*a*, in another exemplary embodiment, data feeds 10, 20, 30, 40 are provided from a DVD. However, upon an input, the media playback device displays home media video stream 60. Home media video stream 60 may be display in addition or in the place of any or all of data feeds 10, 20, 30, 40. This input can come in the form of user-initiated input or through a stream or token of control data. User-initiated input may be provided through the use of a mouse, remote control, or other similar device known to one of ordinary skill in the art wherein user commands are transmitted from the input device to control program of the media playback device.

The embedded code or control data for providing arrangement and modification of the secondary display may be located within the executable file in the media playback device, within the video stream, or from an external source such as the Internet or a server. In one embodiment, control data in the executable file is placed within the video data. As the video plays, control data of the executable file streams into the media interface. This particular embodiment has the ability to store control data within the video streams, instead of storing the control data on the video player or transmitting from an external source. As a result, each video may have highly customized control data for that application, such as a particular brand name or logo, or a design theme that coordinates with the subject matter of the video. The control data may also be loaded separately from the executable file, preloaded, or streamed into the control program from remote sources or non-volatile storage media.

In an alternative embodiment, the display properties of the video streams are determined by control data in a separate stream. During playback, the control data streams through CPU to drive the arrangement and display properties. In one embodiment, before playback of a movie, a media playback device with access to the Internet is connected to a server that streams synchronized control data. The control data may be supplied in the streaming media by the creators of the streaming media. As the video plays, the control data provides customized applications for the executable file to allow the CPU to rearrange, zoom, and resize the video material to create an animating, optimized, high-quality presentation of the combined video streams.

The media playback device allows for an on-screen menu to appear. The user can view the menu through activation by a mouse-click or by depressing a button on the remote control. The on-screen menu provides a plurality of options. One such option may be to view alternative angles of a movie or a documentary of the making of the movie. By selecting this option, the user is enabling "Multi-View Mode." Alternatively, the selection of Multi-View Mode might be enabled by pressing a particular button on a remote control. For example, a button labeled as "Multi-View" may activate any available multiple video streams available to the user. Multi-View Mode may be activated at any point during playback of the video. In order to select other options or features, the user may activate the menu during playback of the video, rather than returning to the main menu. As the main video plays and upon activation of Multi-View Mode, the CPU commands the media co-processor to show a second video stream with accompanying graphics. On the display, a secondary display in the lower left corner appears. Within the secondary display is at least one other video stream besides the main video.

Figure 2:
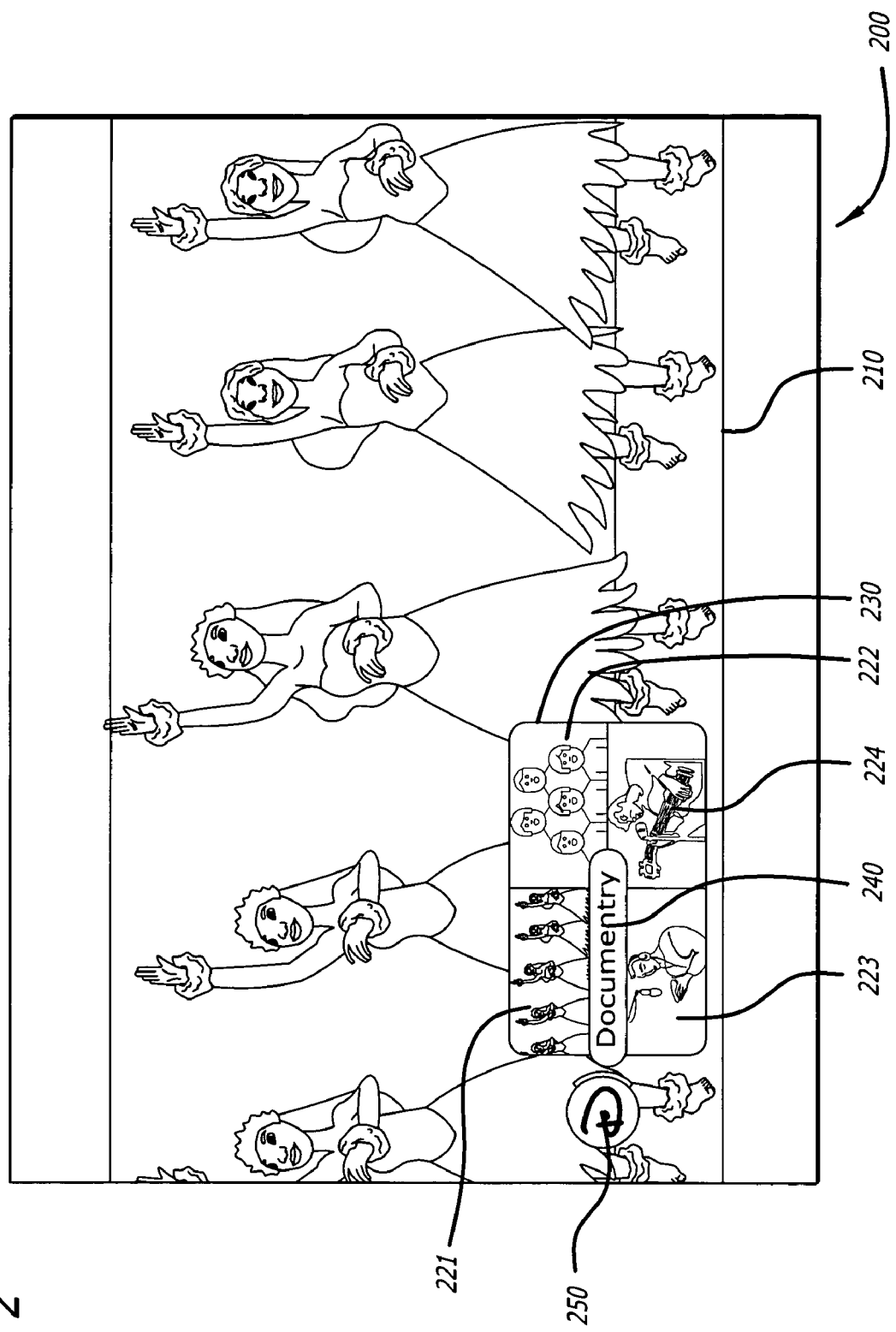
FIG. 2 is a display with a secondary display according to an embodiment.

Referring to FIG. 2, a movie 210 is playing on a display 200. A user selects "Documentary" from an on-screen menu. In the lower left corner is a secondary display 220. Secondary display 220 may be placed in the lower left corner as a default position. Secondary display 220, although appearing in the lower left corner, may appear anywhere on the screen. Secondary display 220 contains streaming video tracks 221, 222, 223, 224. Streaming video tracks 221, 222, 223, 224 may include "behind the scenes" footage, video that provides a basis for the scene, an alternative angle of the scene, commentary, or any other video that could be used to enhance the experience of the user.

Video tracks 221, 222, 223, 224 appear to play over the main video, in graphically defined "windows." Substantially surrounding and between each streaming video track 221, 222, 223, 224 is a graphic design of a window or border 230. Secondary display 220 also contains the chosen menu option, in this case, Documentary 240. Optionally, a marking or text 250 may appear in the corner of display 200 during all of playback to indicate that a menu or options are available to a user.

The graphical images do not exist in the video stream, but are drawn dynamically around the scaled video streams by the media co-processor. The media co-processor draws images unrelated to video into the display buffer of the media playback device. Such images include, but are not limited to, a design substantially around the streaming video, text of instructions, or text of a brand name. The images drawn into the display buffer may serve as a guide to using the multiple feeds or as an aesthetical enhancement for the multimedia experience. Border 230, Documentary 240, and marking 250 are examples of such images drawn into the display buffer.

The drawings for secondary display 220 are based on generic layouts and templates. The generic layout may comprise only border 230 and places secondary display 220 in the lower left corner. The template arranges the video streams such that a first data feed is viewed in a first "window," a second data feed is viewed in a second "window," and so on. Either the generic layout or a customized layout defined in the control data may also include the menu item chosen 240 and marking 250. Any images, designs, text, or other custom programming may be present along with the four tracks appearing in a secondary display on the display. In one embodiment, a layout and template includes user functions associated with a remote control that appear substantially below each video stream to provide on-screen options for the user.

Figure 3A:
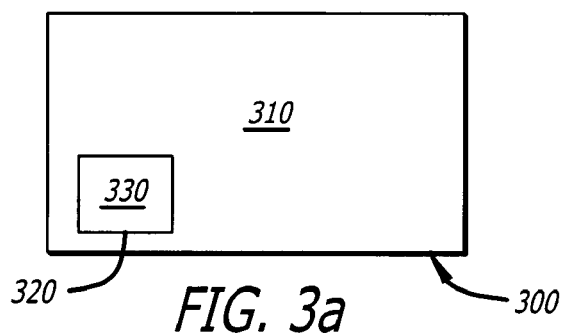
FIGS. 3a-3d are displays with modified secondary displays according to an embodiment.
Figure 3B:
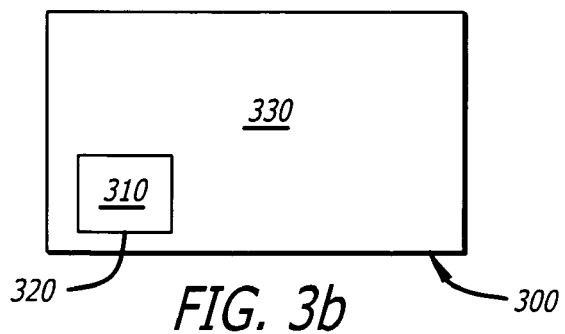

Using the remote control or mouse, the user may select an additional track or video stream to be switched with the main video appearing on the display. Referring to FIG. 3a, a first video 310 appears on display 300. Within a secondary display 320 is a second video 330. When the user watching display 300 sees something of interest in secondary display 320, the user presses a button on the remote control or mouse to swap first video 310 and second video 330. As a result, referring to FIG. 3b, second video 330 appears full-screen on display 300 and first video 310 appears in secondary display 320.

Figure 3C:
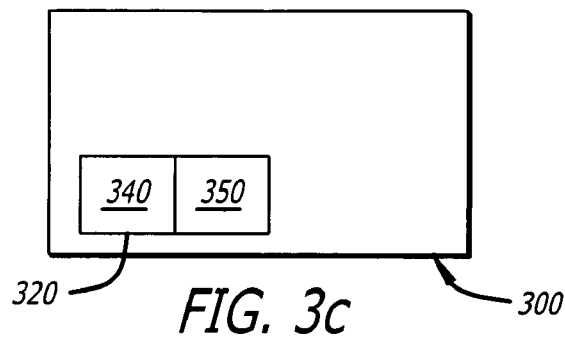
Figure 3D:
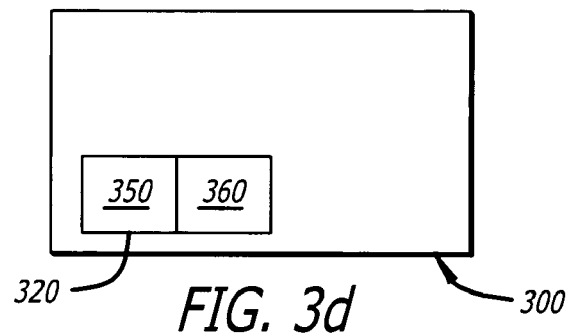

The user may also swap the additional tracks within the secondary display. Referring to FIGS. 3c and 3d, a secondary display 320 is shown in a display 300. The user watching display 300 may swap a second video 340 with a third video 350. Similarly, the user may decide to view a fourth video 360 rather than second video 340. Second video 340 may be deselected. Third video 350 may replace the location of second video 340 in secondary display 320. As a result, the user can customize the secondary display to show only those desired video streams.

Figure 4A:
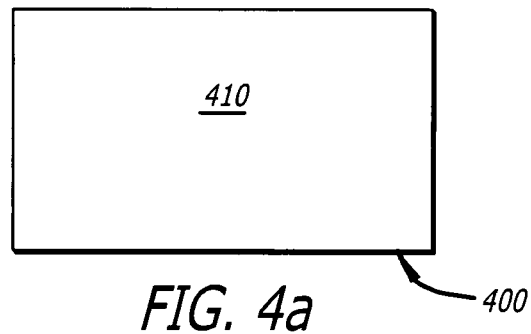
FIGS. 4a-4c are displays with modified secondary displays according to an embodiment.
Figure 4B:
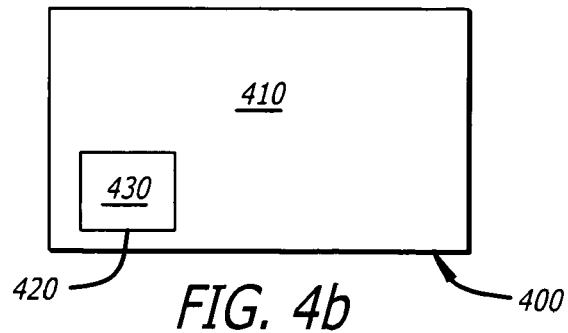
Figure 4C:
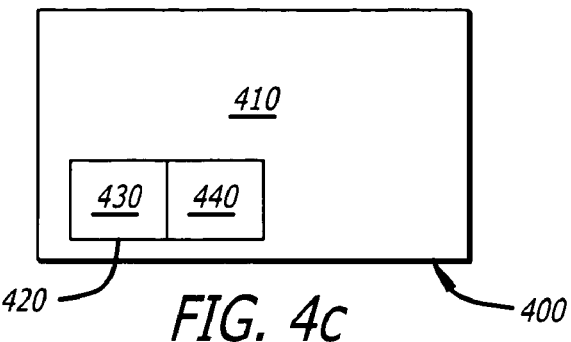

One function is the ability to show and hide any or all of the streaming video. Referring to FIG. 4a, a first video 410 is playing on display 400. A user may then decide either to activate Multi-View Mode in order to show a second video stream. Referring to FIG. 4b, upon activation of Multi-View Mode or by commanding to show a second video stream, a secondary display 420 appears containing a second video 430. Secondary display appears on display 400 and over first video 410. A user may then choose to display a third video stream. Referring to FIG. 4c, upon activation of a third video stream, a third video 440 appears in secondary display 420. The user may decide to show any or all of the available video streams.

Figure 5A:
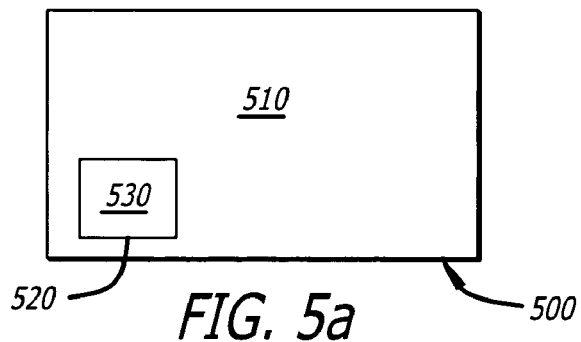
FIGS. 5a-5b are displays with modified secondary displays according to an embodiment.
Figure 5B:
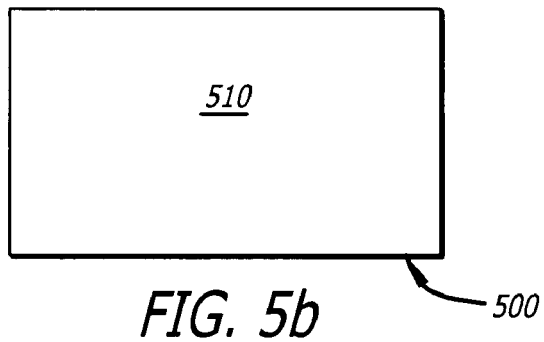

Alternatively, the user may decide to hide any or all of the streaming video. Referring to FIG. 5a, a first video 510 is playing on a display 500. A second video 530 is playing on a secondary display 520. Referring to FIG. 5b, upon the deselection of Multi-View Mode or by selecting not to view the streaming video of second video 530, the secondary display and its contents, i.e., second video 530, are no longer displayed on display 500.

The user may guide a cursor around the video screen using a remote control, mouse, pointer, or other device known to one of ordinary skill in the art for directing an object on a screen. The cursor can be used for relocating or resizing the secondary display. The cursor may also be utilized for selecting an option or video within the secondary display. The cursor may appear as an arrow or any other shape. In one embodiment, the shape of the cursor relates to the theme of a movie. In an alternative embodiment, the cursor may substantially highlight an on-screen button or video.

Unlike conventional picture-in-picture displays, the user can customize the dimensions of both the primary and secondary displays, rather than choosing only a small or large display. By stretching or adjusting the display, the user resizes the video stream displays to any desirable size.

Figure 7A:
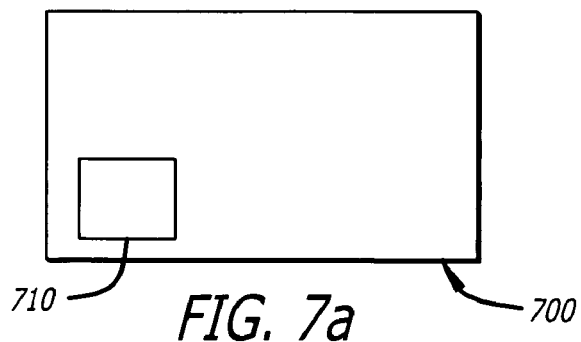
FIGS. 7a-7b are displays with modified secondary displays according to an embodiment.
Figure 6:
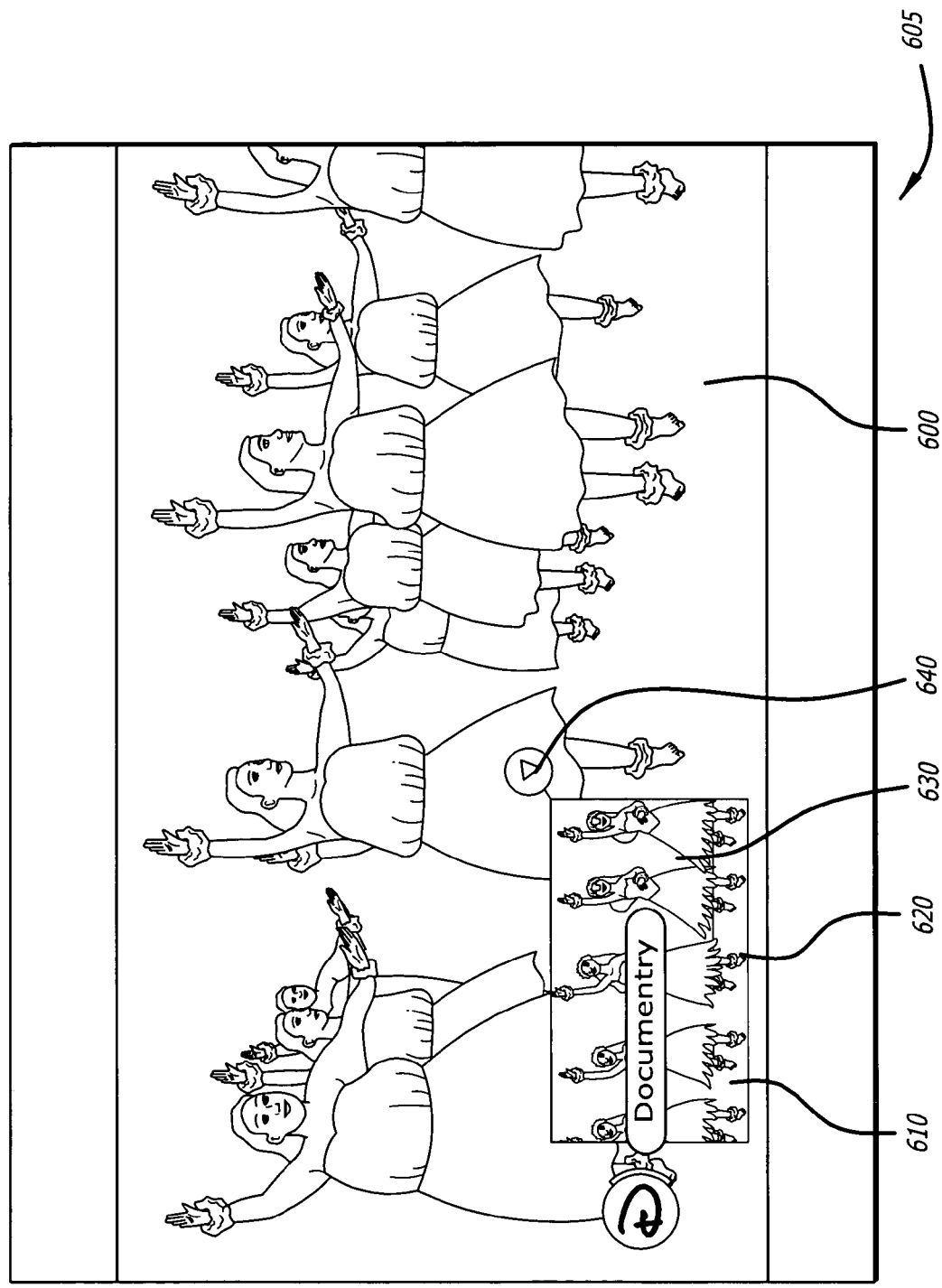
FIG. 6 is a display with a secondary display according to an embodiment.
Figure 7B:
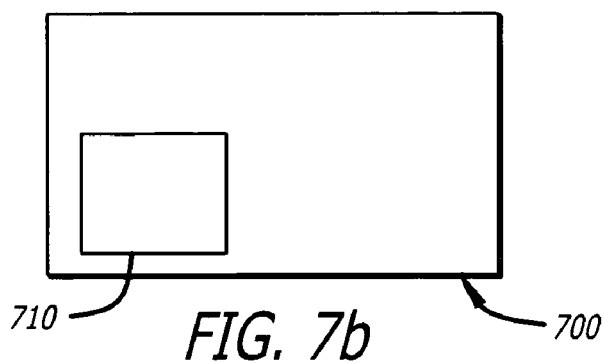

The user can resize a video in the secondary display through the use of the cursor or by other means. Referring to FIG. 6, a secondary display 610 is shown with a second video 630 in addition to main video 605 on display 600. A user may click on the second video 630 or a border 620 of secondary display 610 in order to resize second video 630. Upon selecting border 620 or second video 630, a visual marking 640 indicates that the second video may be resized within display 600. By moving the cursor, remote device, or through use of buttons on the remote device, the user may resize the second video to a desired size. Referring to FIGS. 7a and 7b, a secondary display 710 with a second video can be enlarged or made smaller within display 700. As the cursor moves, the window resizes smoothly along with the cursor movement. Resizing second video 630 can be done during playback of second video 630 and main video 605 without pausing. As a result, a user can experience both streaming videos to enhance their viewing experience.

In a similar function to resizing the secondary display, a user can reshape the secondary display by changing the aspect ratio. By expanding more or less in a horizontal or vertical direction, the user can manipulate the secondary display to better suit the second video in the secondary display or to block less content in the main video. The aspect ratio of the second video changes along with any changes to the aspect ratio of the secondary display, even though it may appear to distort certain images.

The media playback device provides yet another function to allow the user to customize the view of the secondary display. In one embodiment, changing the aspect ratio does not affect the second video. The only part of the second video that would be viewed would be the section still viewable after resizing the secondary display. The user can crop at least one side of the secondary display to make a portion of the second video not viewable. The second video continues to play as usual, but the cropped portion is not viewable on the display. The aspect ratio of the second video is not altered.

Figure 8:
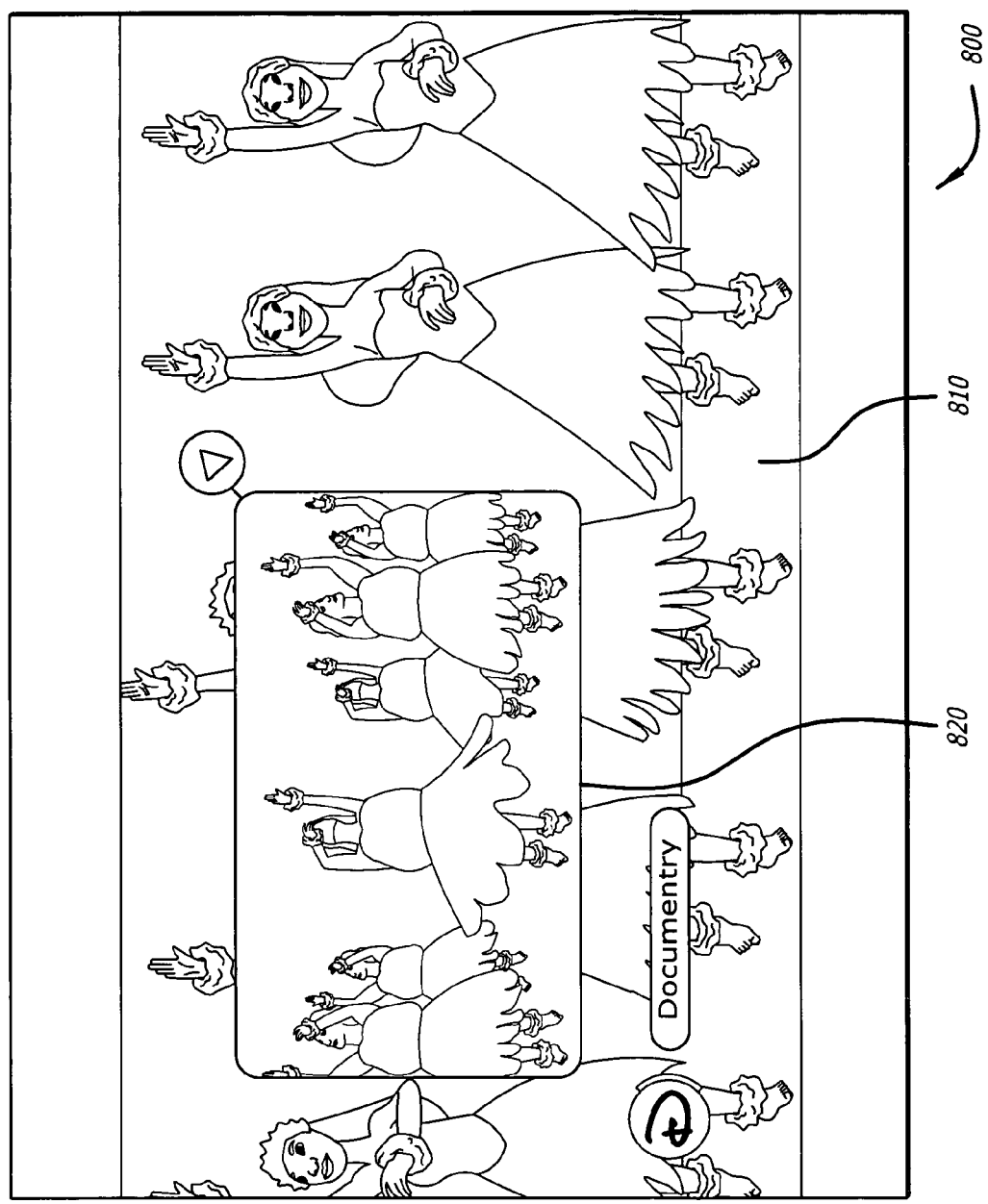
FIG. 8 is a display with a secondary display according to an embodiment.

Upon selecting the secondary display, the user can also choose to move the secondary display to another location on the screen. Referring to FIG. 8, a secondary display 820 on display 800 has been repositioned from the lower left corner to a position that is more centrally located. A user may desire this function to view the contents of a first video 810 in the lower left corner. Alternatively, the user may desire to position the secondary display 820 so that it is easier to view.

Figure 9A:
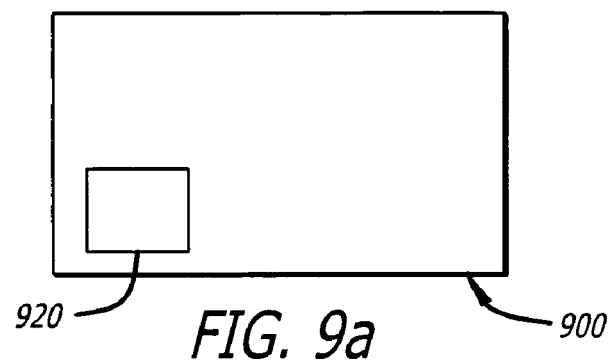
FIGS. 9a-9b are displays with modified secondary displays according to an embodiment.
Figure 9B:
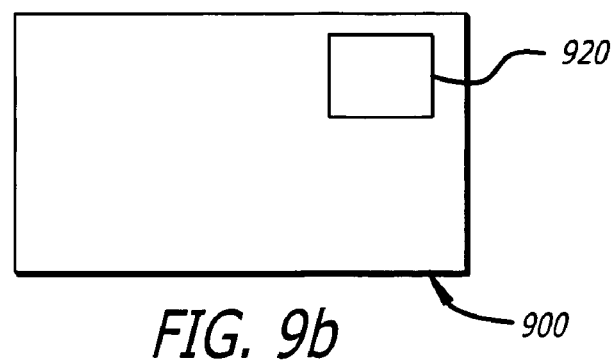

Referring to FIGS. 9a and 9b, a secondary display 920 is positioned in the lower left corner of display 900, although secondary display 920 may be positioned at any location on the screen and moved to any location. Upon deciding to reposition secondary display 920, the user selects the secondary display 920 and guides it with a cursor to the desired location. Throughout the movement from the first position to the second position, the secondary display moves smoothly and the video within the secondary display continues to play. In order to reposition the secondary display, the user is not required to pause or stop the main video or those video streams in the secondary display.

The visual properties of the video streams in the secondary display may be adjusted arbitrarily by the user. Such adjustable visual properties include, but are note limited to, contrast, tint, or color. A user may adjust these properties similar to the methods of adjusting the properties of a television or computer monitor. Controls are available through an on-screen menu and/or use of a remote control with programmed buttons.

Figure 10:
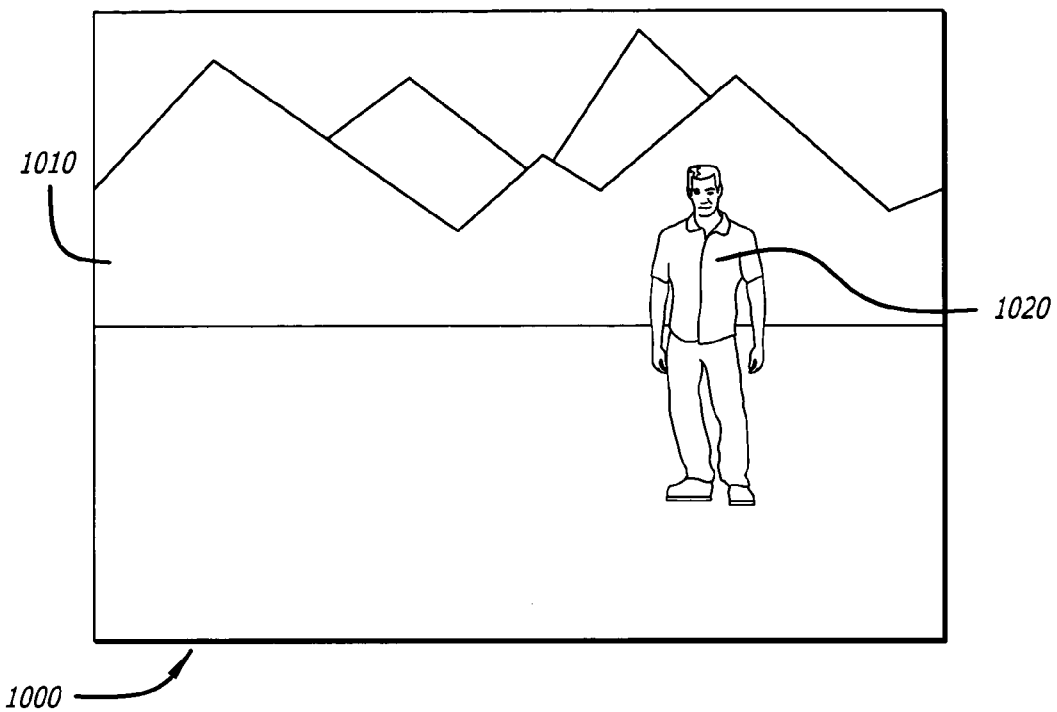
FIG. 10 is a display with a secondary display overlay according to an embodiment.

The control program may also define color key or luminance values for each of the video streams. This give the user the ability to composite video streams against each other, allowing for bluescreen-type overlays. The user maximizes the size of the secondary display to completely overlay the first video. Referring to FIG. 10, a second video 1020 from a secondary display is maximized over a first video 1010 on display 1000. First video 1010 contains a mountain view or background subject matter and becomes the background plate. Second video 1020 contains only a person. By overlaying second video 1020 over first video 1010 and utilizing the bluescreen-type overlay, it appears as though the person of first video 1020 is in the scene of first video 1010. This feature may be desired, for example, if a user would like to create a movie scene or understand the process for creating such a scene. By swapping one of the videos, the user can see a different subject in the scene or the subject in a different scene. In an alternative embodiment, further audio and video streams may be used for a multi-layered overlay.

Alpha, or transparency control, over the video streams allows the media playback device to perform dynamic smooth fade transitions and effects. The user may decide to have one alpha transparent video stream overlaying another video stream. Additionally, this feature allows for one video stream to fade away or into the display.

Figure 11:
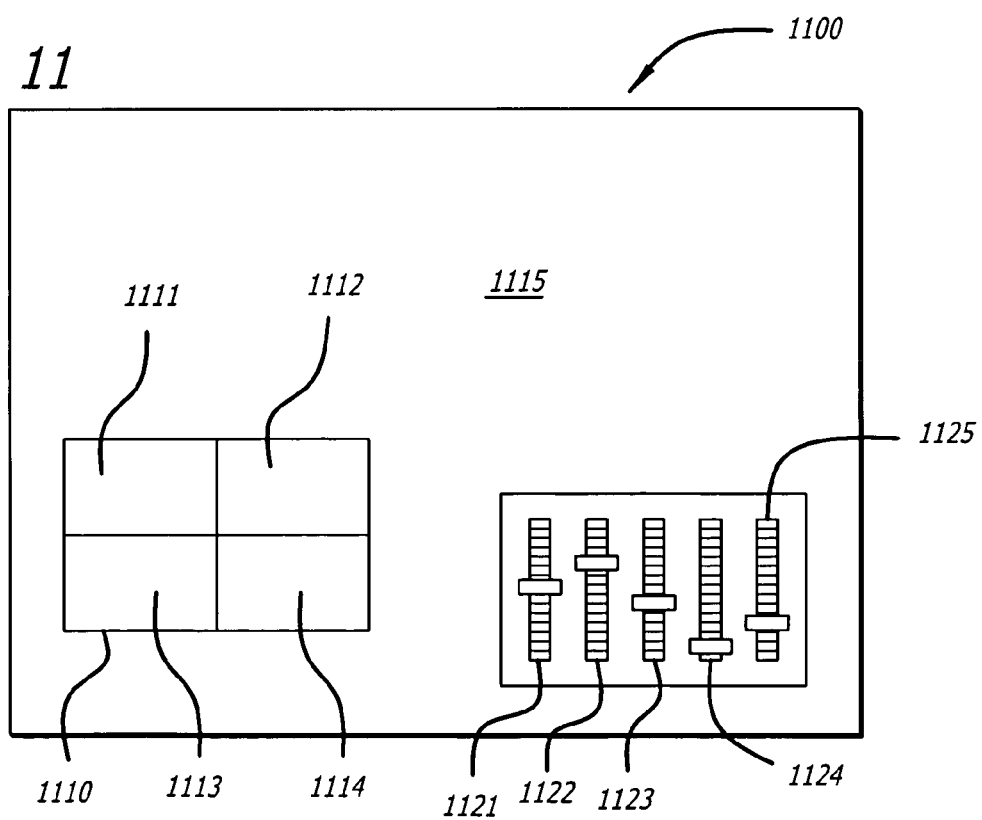
FIG. 11 is a display with a secondary display and audio mixing according to an embodiment.

The media playback device may also be receiving streaming audio tracks in addition to the audio that streams along with the video. The system allows the user to edit and mix the audio that streams into the video player. At the user's command, the system can place a variety of graphic, interactive interfaces on a display. Referring to FIG. 11, a secondary display 1110 is shown on a display 1100. Secondary display 1110 has four streaming video feeds 1111, 1112, 1113, 1114 in addition to the main video 1115. Upon selecting to mix the audio on a remote device, the user is presented with a series of slider bars 1121, 1122, 1123, 1124, 1125 to mix the audio levels of five distinct audio tracks. Slider bars 1121, 1122, 1123, 1124, 1125 correspond to video feeds 1111, 1112, 1113, 1114, 1115, respectively. The user can then adjust the volumes of each audio track for any or all of the video feeds.

While the invention has been described in detail and with reference to specific embodiments thereof, it will be apparent to those skilled in the art that various changes and modifications can be made therein without departing from the spirit and scope thereof. Thus, it is intended that the disclosure cover the modifications and variations provided they fall within the spirit and the scope as described herein.

The invention claimed is:

1. A media playback device for a picture-in-picture presentation of a first video stream and a second video stream, the media playback device comprising:
at least one media interface configured to receive the first video stream and the second video stream, wherein the first video stream is associated with first data and the second video stream is associated with second data, and wherein the first video stream includes the first data, and the second video stream includes the second data; and
a processor configured to obtain the first data and the second data, the processor is further configured to synchronize the picture-in-picture presentation of the first video stream and the second video stream using the first data and the second data to determine a relative offset between the picture-in-picture presentation of the first video stream and the second video stream, and the processor is further configured to maintain the relative offset between the first video stream and the second video stream during the picture-in-picture presentation.

2. The media playback device of claim 1, wherein control data for arranging the picture-in-picture presentation is located within a file in the media playback device.

3. The media playback device of claim 1, wherein control data for arranging the picture-in-picture presentation is located in a source external to the media playback device.

4. The media playback device of claim 1, wherein the first data and the second data are metadata.

5. The media playback device of claim 1, wherein the processor is further configured to synchronize the picture-in-picture presentation of the first video stream and the second video stream by advancing the first video stream and the second video stream at a rate that maintains synchronization.

6. The media playback device of claim 1, wherein control data for arranging the picture-in-picture presentation is located in the second video stream.

7. A method for use by a media playback device for a picture-in-picture presentation of a first video stream and a second video stream, the method comprising:
receiving the first video stream, wherein the first video stream is associated with first data, and wherein the first video stream includes the first data;
receiving the second video stream, wherein the second video stream is associated with second data, and wherein the second video stream includes the second data;
obtaining the first data and the second data;
synchronizing the picture-in-picture presentation of the first video stream and the second video stream using the first data and the second data to determine a relative offset between the picture-in-picture presentation of the first video stream and the second video stream; and
maintaining the relative offset between the first video stream and the second video stream during the picture-in-picture presentation.

8. The method of claim 7, wherein control data for arranging the picture-in-picture presentation is located within a file in the media playback device.

9. The method of claim 7, wherein control data for arranging the picture-in-picture presentation is located in a source external to the media playback device.

10. The method of claim 7, wherein the first data and the second data are metadata.

11. The method of claim 7, wherein the synchronizing the picture-in-picture presentation of the first video stream and the second video stream includes advancing the first video stream and the second video stream at a rate that maintains synchronization.

12. The method of claim 7, wherein control data for arranging the picture-in-picture presentation is located in the second video stream.

13. A picture-in-picture presentation system comprising:
a medium including a first video stream, a second video stream, first data associated with the first video stream and second data associated with the second video stream, wherein the first data and the second data determine a relative offset between the first video stream and the second video stream, and wherein the first video stream includes the first data, and the second video stream includes the second data;
a media playback device for a picture-in-picture presentation of the first video stream and the second video stream from the medium, the media playback device including:
at least one media interface configured to receive the first video stream and the second video stream; and
a processor configured to obtain the first data and the second data, the processor is further configured to synchronize the picture-in-picture presentation of the first video stream and the second video stream using the first data and the second data to determine the relative offset between the picture-in-picture presentation of the first video stream and the second video stream, and the processor is further configured to maintain the relative offset between the first video stream and the second video stream during the picture-in-picture presentation;

a display configured to receive and display the picture-in-picture presentation of the first video stream and the second video stream.

14. The picture-in-picture presentation system of claim 13, wherein control data for arranging the picture-in-picture presentation is located within a file in the media playback device.

15. The picture-in-picture presentation system of claim 13, wherein control data for arranging the picture-in-picture presentation is located in a source external to the media playback device.

16. The picture-in-picture presentation system of claim 13, wherein the first data and the second data are metadata.

17. The picture-in-picture presentation system of claim 13, wherein the processor is further configured to synchronize the picture-in-picture presentation of the first video stream and the second video stream by advancing the first video stream and the second video stream at a rate that maintains synchronization.

18. The picture-in-picture presentation system of claim 13, wherein control data for arranging the picture-in-picture presentation is located in the second video stream.

19. A media playback device for a presentation of a first video stream and a second video stream, the media playback device comprising:

at least one media interface configured to receive the first video stream and the second video stream, wherein the first video stream is associated with first metadata and the second video stream is associated with second metadata, and wherein the first video stream includes the first metadata, and the second video stream includes the second metadata; and a processor configured to obtain the first metadata and the second metadata, the processor is further configured to synchronize the presentation of the first video stream and the second video stream using the first metadata and the second metadata to determine a relative offset between the presentation of the first video stream and the second video stream.

20. The media playback device of claim 19, wherein the processor is further configured to synchronize the presentation of the first video stream and the second video stream by advancing the first video stream and the second video stream at a rate that maintains synchronization.

21. A media playback device for a picture-in-picture presentation of a first video stream and a second video stream, the media playback device comprising:

at least one media interface configured to receive the first video stream and the second video stream, wherein the first video stream is associated with first data and the second video stream is associated with second data, and wherein the first video stream includes the first data, and the second video stream includes the second data; and a processor configured to obtain the first data and the second data, the processor is further configured to synchronize the picture-in-picture presentation of the first video stream and the second video stream using the first data and the second data indicative of a relative offset between the picture-in-picture presentation of the first video stream and the second video stream, and the processor is further configured to maintain the relative offset between the first video stream and the second video stream during the picture-in-picture presentation.

22. The media playback device of claim 21, wherein the processor is further configured to synchronize the picture-in-picture presentation of the first video stream and the second video stream by advancing the first video stream and the second video stream at a rate that maintains synchronization.

23. A method for use by a media playback device for a picture-in-picture presentation of a first video stream and a second video stream, the method comprising:

receiving the first video stream, wherein the first video stream is associated with first data, and wherein the first video stream includes the first data;

receiving the second video stream, wherein the second video stream is associated with second data, and wherein the second video stream includes the second data;

obtaining the first data and the second data;

synchronizing the picture-in-picture presentation of the first video stream and the second video stream using the first data and the second data indicative of a relative offset between the picture-in-picture presentation of the first video stream and the second video stream; and maintaining the relative offset between the first video stream and the second video stream during the picture-in-picture presentation.

24. The method of claim 23, wherein the synchronizing the picture-in-picture presentation of the first video stream and the second video stream includes advancing the first video stream and the second video stream at a rate that maintains synchronization.

25. A picture-in-picture presentation system comprising:

a medium including a first video stream, a second video stream, first data associated with the first video stream and second data associated with the second video stream, wherein the first data and the second data are indicative of a relative offset between the first video stream and the second video stream, and wherein the first video stream includes the first data, and the second video stream includes the second data;

a media playback device for a picture-in-picture presentation of the first video stream and the second video stream from the medium, the media playback device including:

at least one media interface configured to receive the first video stream and the second video stream; and a processor configured to obtain the first data and the second data, the processor is further configured to synchronize the picture-in-picture presentation of the first video stream and the second video stream, using the first data and the second data indicative of the relative offset between the picture-in-picture presentation of the first video stream and the second video stream, and the processor is further configured to maintain the relative offset between the first video stream and the second video stream during the picture-in-picture presentation;

a display configured to receive and display the picture-in-picture presentation of the first video stream and the second video stream.

26. The picture-in-picture presentation system of claim 25, wherein the processor is further configured to synchronize the picture-in-picture presentation of the first video stream and the second video stream by advancing the first video stream and the second video stream at a rate that maintains synchronization.

27. A media playback device for a presentation of a first video stream and a second video stream, the media playback device comprising:
   at least one media interface configured to receive the first video stream and the second video stream, wherein the first video stream is associated with first metadata and the second video stream is associated with second metadata, and wherein the first video stream includes the first metadata, and the second video stream includes the second metadata; and
   a processor configured to obtain the first metadata and the second metadata, the processor is further configured to synchronize the presentation of the first video stream and the second video stream using the first metadata and the second metadata indicative of a relative offset between the presentation of the first video stream and the second video stream.

28. The media playback device of claim 27, wherein the processor is further configured to use the first data and the second data to determine the relative offset between the picture-in-picture presentation of the first video stream and the second video stream.

* * * * *